United States Patent
Kim et al.

(10) Patent No.: US 9,217,670 B2
(45) Date of Patent: Dec. 22, 2015

(54) OBJECT RECOGNITION APPARATUS USING SPECTROMETER AND METHOD THEREOF

(71) Applicant: ELECTRONICS AND TELECOMMUNICATIONS RESEARCH INSTITUTE, Daejeon (KR)

(72) Inventors: Nac Woo Kim, Seoul (KR); Byung Tak Lee, Suwon-si (KR); Mun Seob Lee, Daejeon (KR); Sim Kwon Yoon, Gwangju (KR); Young Sun Kim, Gwangju (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/306,866

(22) Filed: Jun. 17, 2014

(65) Prior Publication Data

US 2015/0177066 A1  Jun. 25, 2015

(30) Foreign Application Priority Data

Dec. 19, 2013  (KR) .................. 10-2013-0159296

(51) Int. Cl.
*G01J 3/40* (2006.01)
*G01J 3/28* (2006.01)
*G06T 7/00* (2006.01)

(52) U.S. Cl.
CPC .............. *G01J 3/2823* (2013.01); *G06T 7/0081* (2013.01); *G01J 2003/2826* (2013.01); *G06T 7/0051* (2013.01); *G06T 2207/10024* (2013.01)

(58) Field of Classification Search
CPC ..... G01J 3/2823; G01B 11/24; G01B 11/255; G06T 7/0051
See application file for complete search history.

(56) References Cited

U.S. PATENT DOCUMENTS

| | | | |
|---|---|---|---|
| 2008/0024443 A1* | 1/2008 | Horikiri ...................... | 345/157 |
| 2008/0046217 A1* | 2/2008 | Polonskiy et al. ............ | 702/179 |
| 2008/0215184 A1 | 9/2008 | Choi et al. | |
| 2009/0245603 A1* | 10/2009 | Koruga et al. ............... | 382/128 |
| 2010/0259570 A1 | 10/2010 | Omi et al. | |
| 2012/0275701 A1* | 11/2012 | Park et al. ..................... | 382/173 |
| 2013/0002882 A1* | 1/2013 | Onozawa et al. ............ | 348/164 |

FOREIGN PATENT DOCUMENTS

| | | |
|---|---|---|
| KR | 10-2002-002437 A | 1/2002 |
| KR | 10-2010-0098658 A | 9/2010 |

* cited by examiner

*Primary Examiner* — Gregory J Toatley
*Assistant Examiner* — Maurice Smith
(74) *Attorney, Agent, or Firm* — Rabin & Berdo, P.C.

(57) ABSTRACT

Provided are an apparatus and method for recognizing an object on the basis of property information on an object obtained using a multi-wavelength spectrometer. An apparatus for recognizing an object using a multi-wavelength spectrometer includes an image processing unit configured to extract an region of interest from an input three-dimensional image and output shape information on the region of interest, a light irradiation unit configured to irradiate light of a plurality of wavelengths to an arbitrary position of an object corresponding to the detected region of interest, a light receiving unit configured to measure a spectrophotometric value for each light of the plurality of wavelengths, and a light processing unit configured to generate a differential spectrophotometric map using a differential value between spectrophotometric values of different wavelengths measured at the same light irradiation position, and recognize the object using the differential spectrophotometric map and the shape information.

19 Claims, 4 Drawing Sheets

OBJECT RECOGNITION APPARATUS USING SPECTROMETER AND METHOD THEREOF

CROSS-REFERENCE TO RELATED APPLICATIONS

This application claims priority under 35 U.S.C. §119 to Korean Patent Application No. 10-2013-0159296, filed on Dec. 19, 2013, the disclosure of which is incorporated herein by reference in its entirety.

TECHNICAL FIELD

The present invention relates to an object recognition apparatus and method, and more particularly, to a technology for recognizing an object on the basis of property information about object obtained using a multi-wavelength spectrometer.

BACKGROUND

An advanced image processing technology and an artificial intelligence technology should be combined with each other to develop an image recognition technology. According to the image recognition technology, a situation and an object behavior pattern in an image are recognized through linkage between a low-level process on image information (image segmentation based on location information, depth information and motion information) and a high-level process on the image information (current situation prediction and behavior recognition), in a similar manner as visual functioning of a living thing in which an image is mapped through neurons of a brain so as to be abstraction-processed.

Here, for the low-level process, process techniques such as main feature information extraction, boundary extraction, region division, depth information calculation and motion information calculation with respect to an image are applied. In particular, for the region division, spectrum properties such as light intensity may be used, or shape properties such as eccentricity and density and boundary properties such as curvature and contrast may be used.

According to an image recognition technology according to a related art, a value of pixel intensity difference between adjacent pixels in an image is calculated for the region division based on light intensity. However, such a technology using the value of pixel intensity difference is not able to provide a recognition rate that is robust against external environment change.

SUMMARY

Accordingly, the present invention provides an object recognizing apparatus and method which improve object identification performance by using spectrophotometric measurement values based on light transmittance and light reflectivity of an object to be recognized.

In one general aspect, an apparatus for recognizing an object using a multi-wavelength spectrometer includes: an image processing unit configured to extract an region of interest from an input three-dimensional image and output shape information on the region of interest; a light irradiation unit configured to irradiate light of a plurality of wavelengths to an arbitrary position of an object corresponding to the detected region of interest; a light receiving unit configured to measure a spectrophotometric value for each light of the plurality of wavelengths; and a light processing unit configured to generate a differential spectrophotometric map using a differential value between spectrophotometric values of different wavelengths measured at the same light irradiation position, and recognize the object using the differential spectrophotometric map and the shape information.

In a preferred embodiment, the light processing unit may divide the region of interest into a plurality of partial regions using a correlation between differential spectrophotometric values calculated for different light irradiation positions of the object.

In another embodiment, light processing unit may divide the region of interest into a plurality of partial regions using a dividing technique including region growing on the basis of a differential spectrophotometric value calculated for an arbitrary light irradiation position.

In another embodiment, the light processing unit may generate a cluster based on a light irradiation position within the region of interest, and generate the differential spectrophotometric map using an average value of differential spectrophotometric values calculated for the light irradiation position within the cluster.

In another embodiment, the light processing unit may divide the region of interest into a plurality of partial regions, and compare spectrometry-based property information detected from the partial regions with property information of a pre-established property information database, so as to recognize the object.

In another embodiment, the light processing unit may divide the region of interest into a plurality of partial regions, and recognize the object on the basis of a correlation between spectrometry-based property information detected from the partial regions and the shape information.

In another embodiment, the light processing unit may divide the region of interest into a plurality of partial regions using the differential spectrophotometric map, and calculate standard errors for differential spectrophotometric values for each partial region so as to determine whether the calculated values exceed a preset threshold value.

The apparatus may further include a control unit for controlling operation of the light irradiation unit.

Here, when it is determined that at least one of the standard errors for differential spectrophotometric values calculated for each partial region exceeds the preset threshold value, the light control unit may control the light irradiation unit so that light of a wavelength different from a plurality of wavelengths of previously irradiated light is irradiated.

In a preferred embodiment, the control unit may control the light irradiation unit so that the light of the different wavelength is irradiated until the standard errors for differential spectrometric values calculated for each partial region do not exceed the preset threshold value.

In another general aspect, an apparatus for recognizing an object using a multi-wavelength spectrometer includes: an image processing unit configured to extract an region of interest from an input three-dimensional image and output shape information on the region of interest; a light irradiation unit configured to irradiate light of a plurality of wavelengths to an arbitrary position of an object corresponding to the detected region of interest; a light receiving unit configured to measure a spectrophotometric value of light of first and second wavelengths for a first light irradiation position, and measure a spectrophotometric value of light of first and second wavelengths for a second light irradiation position; and a light processing unit configured to calculate a first differential spectrophotometric value between the light of the first wavelength and the light of the second wavelength for the first light irradiation position, calculate a second differential spectrophotometric value between the light of the first wavelength and the light of the second wavelength for the second light irradiation position, and generate a differential spectrophotometric map using a correlation between the first differential spectrophotometric value and the second differential spectrophotometric value.

In another general aspect, a method for recognizing an object using a multi-wavelength spectrometer includes: extracting an region of interest from an input three-dimensional image and outputting shape information on the region of interest; irradiating light of a plurality of wavelengths to an arbitrary position of an object corresponding to the detected region of interest; measuring a spectrophotometric value for each light of the plurality of wavelengths; generating a differential spectrophotometric map using a differential value between spectrophotometric values of different wavelengths measured at the same light irradiation position; and recognizing the object using the differential spectrophotometric map.

In a preferred embodiment, the generating of the differential spectrophotometric map may include dividing the region of interest into a plurality of partial regions using a correlation between differential spectrophotometric values calculated for different light irradiation positions of the object.

In another embodiment, the generating of the differential spectrophotometric map may include dividing the region of interest into a plurality of partial regions using a dividing technique including region growing on the basis of a differential spectrophotometric value calculated for an arbitrary light irradiation position.

In another embodiment, the generating of the differential spectrophotometric map may include generating a cluster based on a light irradiation position within the region of interest, and generating the differential spectrophotometric map using an average value of differential spectrophotometric values calculated for the light irradiation position within the cluster.

In another embodiment, the generating of the differential spectrophotometric map may include: calculating a first differential spectrophotometric value between the light of the first wavelength and the light of the second wavelength for the first light irradiation position; calculating a second differential spectrophotometric value between the light of the first wavelength and the light of the second wavelength for the second light irradiation position; and dividing the region of interest into a plurality of partial regions using a correlation between the first differential spectrophotometric value and the second differential spectrophotometric value.

In a preferred embodiment, the recognizing of the object may include dividing the region of interest into a plurality of partial regions, and recognizing the object on the basis of a correlation between spectrometry-based property information detected from the partial regions and the shape information.

In a preferred embodiment, the recognizing of the object may include dividing the region of interest into a plurality of partial regions, and comparing spectrometry-based property information detected from the partial regions with property information of a pre-established property information database, so as to recognize the object.

The method may further include: dividing the region of interest into a plurality of partial regions using the differential spectrophotometric map, and calculating standard errors for differential spectrophotometric values for each partial region so as to determine whether the calculated values exceed a preset threshold value; and irradiating, when it is determined that at least one of the standard errors for differential spectrophotometric values calculated for each partial region exceeds the preset threshold value, light of a wavelength different from a plurality of wavelengths of previously irradiated light.

Other features and aspects will be apparent from the following detailed description, the drawings, and the claims.

DETAILED DESCRIPTION OF EMBODIMENTS

Figure 1:
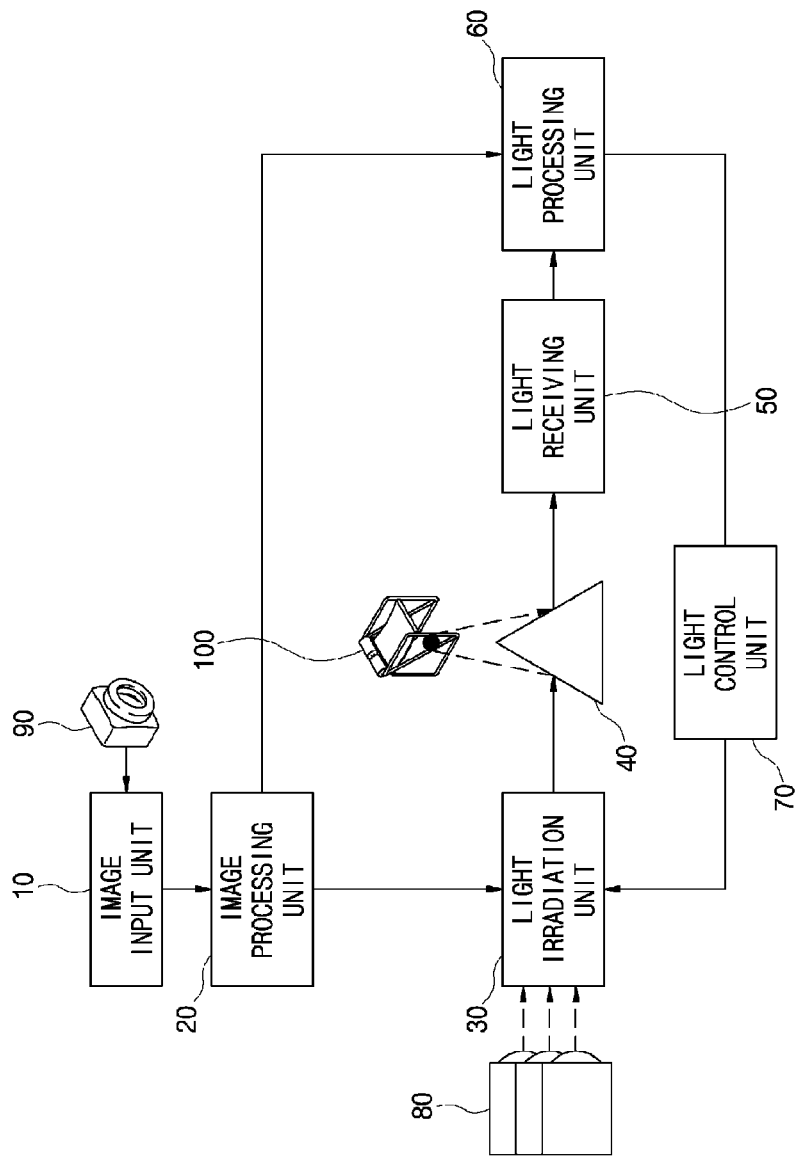
FIG. 1 is a block diagram illustrating an object recognition apparatus using a multi-wavelength spectrometer according to an embodiment of the present invention.

Advantages and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims. In the following description, the technical terms are used only for explaining a specific exemplary embodiment while not limiting the present invention. The terms of a singular form may include plural forms unless specifically mentioned.

Hereinafter, exemplary embodiments of the present invention will be described in detail with reference to the accompanying drawings. In adding reference numerals for elements in each figure, it should be noted that like reference numerals already used to denote like elements in other figures are used for elements wherever possible. Moreover, detailed descriptions related to well-known functions or configurations will be ruled out in order not to unnecessarily obscure subject matters of the present invention.

FIG. 1 is a block diagram illustrating an object recognition apparatus using a multi-wavelength spectrometer according to an embodiment of the present invention.

Referring to FIG. 1, the object recognition apparatus using the multi-wavelength spectrometer according to the present invention includes an image input unit 10, an image processing unit 20, a light irradiation unit 30, a light receiving unit 50 and a light processing unit 60.

The image input unit 10 receives a two-dimensional image or three-dimensional image obtained by an image acquisition device 90 and processes the received image into a three-dimensional image format processable by the image processing unit 20.

The image acquisition device 90 obtains a three-dimensional image including distance image by using a stereo structure of two sensors of the same type (e.g., CCD, IR, etc.) in the case of a manual sensor or using kinect or time of fight (TOF) in the case of an active sensor. Here, the image includes both an analog image and a digital image, but it is assumed that the image is converted to a digital image so as to be input. Image sequences that have been converted to digital signals are sequentially input to the image input unit 10.

The image processing unit 20 detects a region of interest from the input three-dimensional image, and generates shape information on the detected interest object region.

Various known techniques for detecting objects from three-dimensional images may be used. For example, a technique for detecting an object according to an object size change using distance information on the object, a technique for detecting an object by setting an arbitrary threshold value on a depth image and using an x-depth map according thereto, and a technique for detecting an object using motion information and a depth projection map (DPM) that is an accumulated value of depth information may be used.

Detailed descriptions related to the above-mentioned techniques are omitted in order not to unnecessarily obscure subject matters of the present invention.

The light irradiation unit 30, for example a light irradiator, irradiates multi-wavelength light to a subject (or object) corresponding to the region of interest detected by the image processing unit 20.

According to one embodiment, at least one light source 80 for outputting multi-wavelength light is positioned in the vicinity of the light irradiation unit 30 so that the at least one light source 80 transfers the multi-wavelength light to the light irradiation unit 30, and the light irradiation unit 30 irradiates the multi-wavelength light to an arbitrary position of an object according to control of the light control unit 70.

The multi-wavelength light emitted from the light irradiation unit 30 may be irradiated to the arbitrary position of the object through an optical scanner 40. The light irradiation unit 30 may change an irradiation position of the multi-wavelength light using the optical scanner 40. Change of the wavelength of the irradiated light and change of the irradiation position are controlled by the light control unit 70. This operation will be described later.

The light receiving unit 50, for example a light receiver, receives light transmitted through or reflected from an object and measures a spectrophotometric value for each of a plurality of wavelengths of light. Here, the spectrophotometric value may be used as a property value that reflects light transmittance and light reflectivity of an irradiation position.

For example, it is assumed that light of a first wavelength and light of a second wavelength are irradiated to a first light irradiation position of an object, and the light of the first wavelength and the light of the second wavelength are irradiated to a second irradiation position of the object.

In this case, the light receiving unit 50 may measure a spectrophotometric value of the light of the first wavelength and a spectrometric value of the light of the second wavelength at the first light irradiation position, and may measure a spectrophotometric value of the light of the first wavelength and a spectrophotometric value of the light of the second wavelength at the second light irradiation position, so that the measured values are managed for each irradiation position and each wavelength.

The light processing unit 60 generates a differential spectrophotometric map using a spectrophotometric value for each wavelength with respect to a specific light irradiation position transferred from the light receiving unit 50, and recognizes an object using the differential spectrometric map. Hereinafter, an internal structure of the light processing unit 60 and processes performed in functional blocks thereof will be described in detail with reference to FIG. 2.

Figure 2:
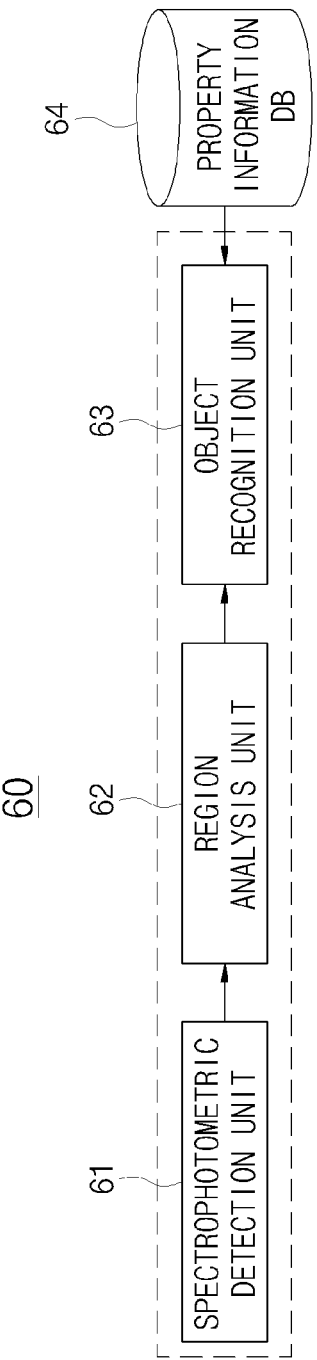
FIG. 2 is a block diagram illustrating an internal structure of the light processing unit of FIG. 1.

FIG. 2 is a block diagram illustrating the internal structure of the light processing unit of FIG. 1.

Referring to FIG. 2, the light processing unit 60 includes a spectrophotometric detection unit 61, a region analysis unit 62 and an object recognition unit 64.

The spectrophotometric detection unit 61 receives spectrophotometric values for different wavelengths measured at the same light irradiation position from the light receiving unit 50 and calculates a value of difference between the spectrophotometric values.

For example, when the spectrophotometric value of the light of the first wavelength and the spectrophotometric value of the light of the second wavelength for the first light irradiation position are received, a value of difference between the spectrophotometric values of the light of the first wavelength and the light of the second wavelength is calculated with respect to the first light irradiation position. Furthermore, when the spectrophotometric value of the light of the first wavelength and the spectrophotometric value of the light of the second wavelength for the second light irradiation position are received, a value of difference between the spectrophotometric values of the light of the first wavelength and the light of the second wavelength is calculated with respect to the second light irradiation position.

The spectrophotometric detection unit 61 obtains a value of difference between spectrophotometric values for different wavelengths for each light irradiation position in the manner described above, and generates the differential spectrophotometric map using the obtained value. For example, a plurality of light irradiation positions may be designated in the region of interest, and the differential spectrophotometric value for each light irradiation position calculated by the spectrophotometric detection unit 61 may be used as a value representing a property of a corresponding position.

The spectrophotometric detection unit 61 may generate a cluster based on a light irradiation position within the region of interest, and may generate the differential spectrophotometric map using an average value of differential spectrophotometric values calculated for the light irradiation position within the cluster. That is, on the basis of the fact that differential spectrophotometric values calculated for a specific light irradiation position and a light irradiation position adjacent thereto are high possibly similar to each other, the average values of the differential spectrophotometric values including those of the adjacent irradiation position is calculated, and the differential spectrophotometric map may be generated using the average value. In this manner, dense information may be processed into sparse information while minimizing local error, thereby reducing an amount of calculation.

The region analysis unit 62 divides the region of interest into partial regions having similar characteristics using the differential spectrophotometric map.

According to one embodiment, the region analysis unit 62 may divide the region of interest into a plurality of partial regions using a correlation between differential spectrophotometric values calculated for different light irradiation positions.

According to another embodiment, the region analysis unit 62 may divide the region of interest into the plurality of partial regions using a dividing technique including a region growing method on the basis of a differential spectrophotometric value calculated for an arbitrary light irradiation position.

The region growing method is one of representative region dividing techniques. According to this method, regions having the same features are gradually combined and grown, from an adjacent small region, so that an entire image is divided finally. For example, on the assumption that a starting point of region growing is P (seed), a similarity between P and adjacent region Pi (i=1, 2, 3, 4) is calculated, and the regions are regarded as the same region if the similarity is greater than a certain threshold value.

The region analysis unit 62 divides the region of interest into the plurality of partial regions using the differential spectrophotometric map, and calculates a standard error for a differential spectrophotometric value for each partial region so as to determine whether the calculated value exceeds a preset threshold value.

If the standard error of the differential spectrophotometric value for a specific partial region is within the threshold value, this indicates that the partial region highly possibly has the same property and the region dividing operation has been performed normally. On the contrary, if the standard error of the differential spectrophotometric value for the specific partial region exceeds the threshold value, the partial region does not highly possibly have the same property. In this case, the properties of the divided regions may not be used as representative values for recognizing an object.

In order to overcome the occurrence of such an error, the multi-wavelength spectrometer according to the present invention provides a unit for changing a light irradiation position or allowing irradiation of light of a new wavelength.

The multi-wavelength spectrometer according to the present invention may exemplarily include the light control unit 70 for controlling operation of the light irradiation unit 30.

When it is determined that at least one of standard errors for differential spectrophotometric values calculated for each partial region exceeds the preset threshold value, the light control unit 70 controls the light irradiation unit 30 so that light of a wavelength different from a plurality of wavelengths of previously irradiated light is irradiated.

The light control unit 70 may control the light irradiation unit 30 so that the light of a different wavelength is irradiated until the standard errors for differential spectrometric values calculated for each partial region do not exceed the preset threshold value.

The object recognition unit 63 compares spectrometry-based property information detected from each partial region divided in the region analysis unit 62 with property information of a pre-established property information database 64, so as to recognize an object.

For example, the object recognition unit 63 may recognize an object on the basis of a correlation between the spectrometry-based property information detected from each partial region and shape information on the object obtained from the image processing unit.

The internal structure and operation of the multi-wavelength spectrometer according to the present invention have been described. Hereinafter, specific operations of the multi-wavelength spectrometer for recognizing an object will be described in detail with reference to FIGS. 3 and 4.

Figure 3:
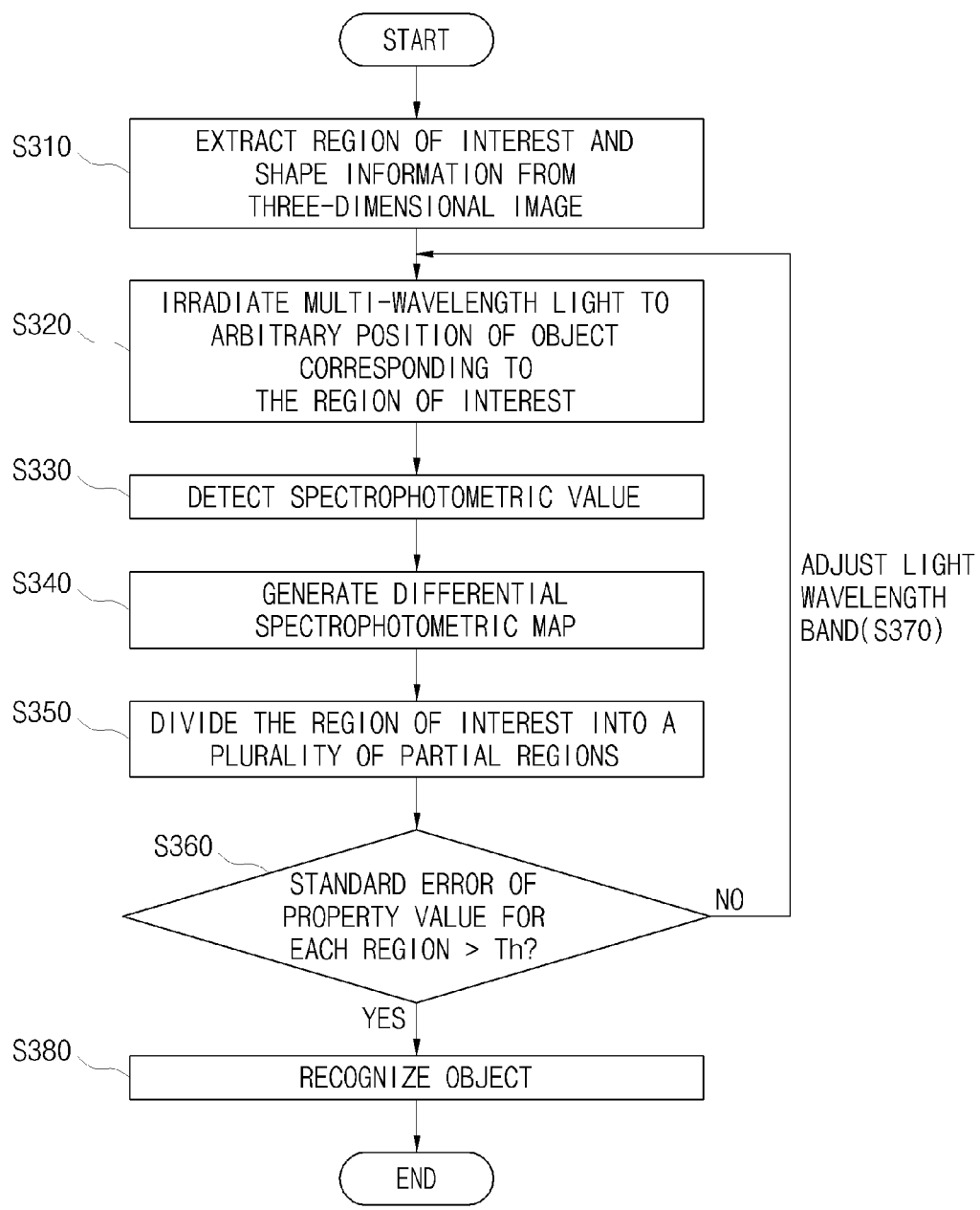
FIG. 3 is a flowchart illustrating an object recognition method using a multi-wavelength spectrometer according to another embodiment of the present invention.
Figure 4:
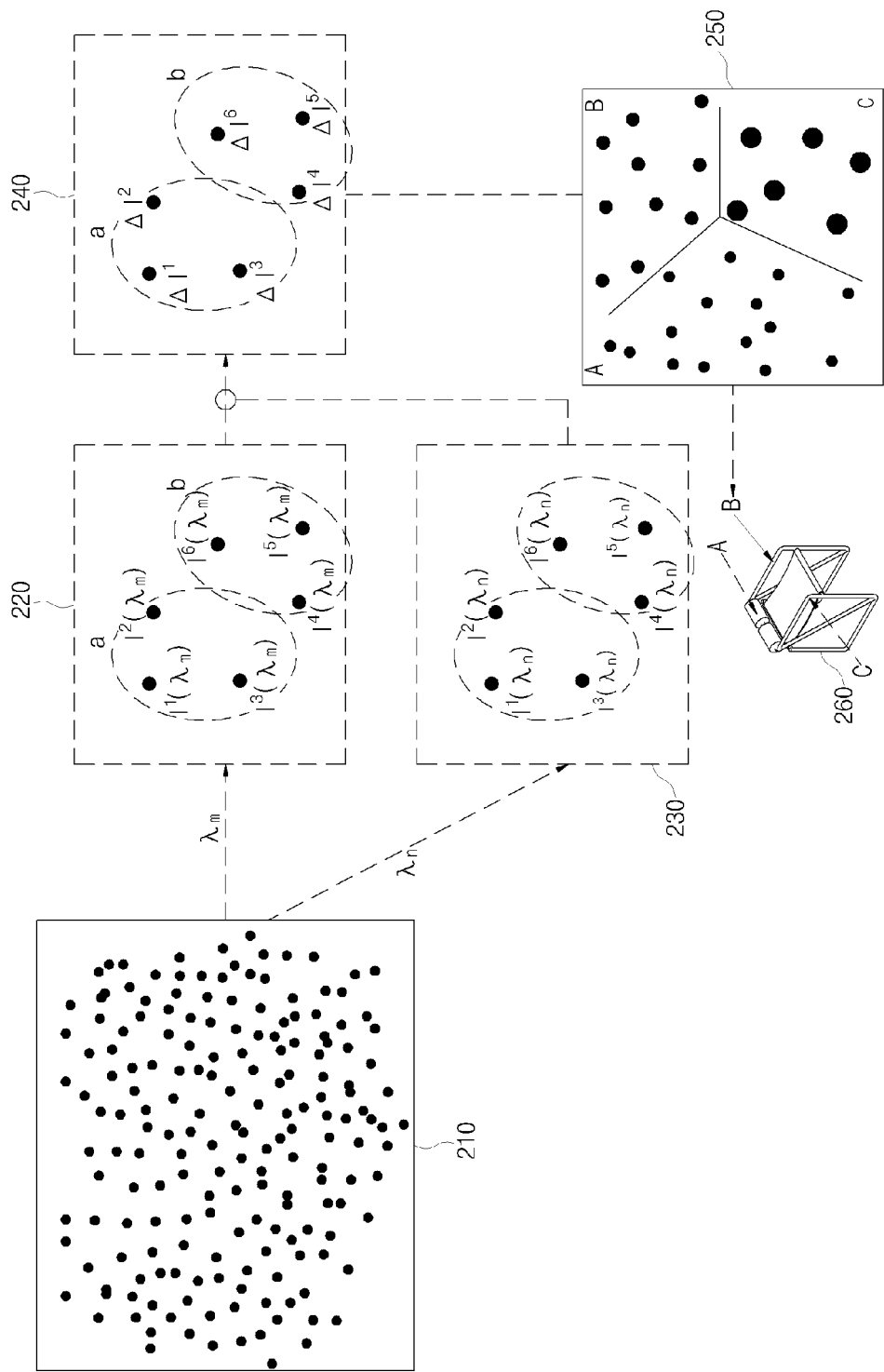
FIG. 4 is a diagram illustrating an example of object recognition performed in an object recognition apparatus using a multi-wavelength spectrometer according to an embodiment of the present invention.

FIG. 3 is a flowchart illustrating a method for recognizing an object using the multi-wavelength spectrometer according to another embodiment of the present invention, and FIG. 4 is a diagram illustrating an example of object recognition performed in the object recognition apparatus using the multi-wavelength spectrometer according to an embodiment of the present invention.

In operation S310, the image processing unit 20 detects a region of interest from an input three-dimensional image, and obtains shape information on an object.

In operation S320, the light irradiation unit 30 irradiates multi-wavelength light to an arbitrary position of an object 100 corresponding to the region of interest according to control of the light control unit. 70. FIG. 4 illustrates a result of irradiating the multi-wavelength light to the arbitrary position of the object.

In operation S330, the light receiving unit 50 measures a spectrophotometric value of the multi-wavelength light with respect to each light irradiation position. For example, on the assumption that spectrophotometric values of $m^{th}$ wavelength light with respect to light irradiation positions (I1 to I6) are I1 ($\lambda$m) to I6 ($\lambda$m) (220), and spectrophotometric values of nth wavelength light with respect to the light irradiation positions (I1 to I6) are I1 ($\lambda$n) to I6 ($\lambda$n) (230), as illustrated in FIG. 4, the light processing unit 60 calculates differential spectrophotometric values of the spectrophotometric values of the multi-wavelength light for each light irradiation position (240).

For example, a differential spectrophotometric value for each light irradiation position between the $m^{th}$ wavelength light and the nth wavelength light may be calculated as expressed in Equation (1) below.

$$\Delta Ik = Ik(\lambda m) - Ik(\lambda n) \tag{1}$$

Here, $\Delta Ik$ denotes a differential spectrophotometric value for each light irradiation position, $Ik(\lambda m)$ denotes a differential spectrophotometric value of the mth light for each light irradiation position, and $Ik(\lambda n)$ denotes a differential spectrophotometric value of the nth light for each light irradiation position.

In operation S340, the light processing unit 60 generates a differential spectrophotometric map using the differential spectrophotometric values for each light irradiation position. Here, the light processing unit 60 may calculate differential spectrophotometric values for small-region groups 'a' and 'b' (see FIG. 4) so as to generate the differential spectrophotometric map (240).

In operation S350, the light processing unit 60 divides the region of interest into a plurality of partial regions using the differential spectrophotometric map.

FIG. 4 illustrates an example in which the region of interest is divided into three regions (A to C regions). As described above, if spectrophotometric values having a high degree of correlation belong to a single identical region, and, for example, a similarity between the differential spectrophotometric values is greater than a specific threshold value, the regions are regarded as the same region.

If a standard deviation of the differential spectrophotometric value for each light irradiation position belonging to the same region is within a determined error value in operation S360, the process proceeds to the object recognition procedure, otherwise an iterative process is performed so that laser light of another wavelength is irradiated in operation S370.

In operation S380, the light processing unit 60 recognizes an object using a property value (e.g., differential spectrophotometric value) for each partial region and the shape information on the object.

In the case of using a multi-wavelength lidar sensor device according to the present invention, by adding a function for measuring unique properties of an object, such as color and reflectivity, to a three-dimensional image lidar sensor for measuring a location and speed of a measurement object, the object may be identified and traced more correctly and rapidly.

Furthermore, in the case where a plurality of lidar sensors are distributed in a space where measurement coverage overlap each other, interference between adjacent lidar sensor signals and natural noise may be removed through methods of generating and receiving multi-wavelength pulse signals according to the present invention.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for recognizing an object using a multi-wavelength spectrometer, the apparatus comprising:
   a processor,
   a storage medium containing program instructions, execution of which by the processor causes the apparatus to provide functions of:
      an image processing unit configured to extract a region of interest from an input three-dimensional image, the region of interest corresponding to the object captured in the input image, and to obtain shape information of the object using the extracted region of interest, and
      a light processing unit;
   a light irradiator configured to irradiate light of a plurality of wavelengths to the object corresponding to the detected region of interest; and
   a light receiving unit receiver configured to measure a spectrophotometric value for each light of the plurality of wavelengths; wherein
   the light processing unit is configured to generate a differential spectrophotometric map using differential spectrophotometric values between the spectrophotometric values of different wavelengths measured at a same light irradiation position, and recognize the object using the differential spectrophotometric map and the shape information.

2. The apparatus of claim 1, wherein the light processing unit divides the region of interest into a plurality of partial regions using a correlation between differential spectrophotometric values calculated for different light irradiation positions of the object.

3. The apparatus of claim 1, wherein the light processing unit divides the region of interest into a plurality of partial regions using a dividing technique including region growing on the basis of a differential spectrophotometric value calculated for an arbitrary light irradiation position.

4. The apparatus of claim 1, wherein the light processing unit generates a cluster of spectrophotometric values based on a light irradiation position within the region of interest, and generates the differential spectrophotometric map using an average value of the differential spectrophotometric values calculated for the light irradiation position within the cluster.

5. The apparatus of claim 1, wherein the light processing unit divides the region of interest into a plurality of partial regions, and compares spectrometry-based property information detected from the partial regions with property information of a pre-established property information database.

6. The apparatus of claim 1, wherein the light processing unit divides the region of interest into a plurality of partial regions, and recognizes the object on the basis of a correlation between spectrometry-based property information detected from the partial regions and the shape information.

7. The apparatus of claim 1, wherein the light processing unit divides the region of interest into a plurality of partial regions using the differential spectrophotometric map, and calculates standard errors for differential spectrophotometric values for each partial region so as to determine whether the calculated values exceed a preset threshold value.

8. The apparatus of claim 7, wherein the functions include functions of controlling operation of the light irradiator, including, when it is determined that at least one of the standard errors for differential spectrophotometric values calculated for each partial region exceeds the preset threshold value, controlling the light irradiator so that light of a wavelength different from a plurality of wavelengths of previously irradiated light is irradiated.

9. The apparatus of claim 8, wherein the controlling includes controlling the light irradiator so that the light of the different wavelength is irradiated until the standard errors for differential spectrometric values calculated for each partial region do not exceed the preset threshold value.

10. The apparatus of claim 1, further comprising an image input device that generates the input image showing the object.

11. An apparatus for recognizing an object using a multi-wavelength spectrometer, the apparatus comprising:
    a processor,
    a storage medium containing program instructions, execution of which by the processor causes the apparatus to provide functions of:
       an image processing unit configured to extract a region of interest from an input three-dimensional image, the region of interest corresponding to the object captured in the input image, and to obtain shape information of the object using the region of interest, and
       a light processing unit;
    a light irradiator configured to irradiate light of a plurality of wavelengths to the object; and
    a light receiving unit receiver configured to
       measure a spectrophotometric value of light of first and second wavelengths for a first light irradiation position, and
       measure a spectrophotometric value of light of first and second wavelengths for a second light irradiation position; wherein
    the light processing unit is configured to
       calculate a first differential spectrophotometric value between the light of the first wavelength and the light of the second wavelength for the first light irradiation position,
       calculate a second differential spectrophotometric value between the light of the first wavelength and the light of the second wavelength for the second light irradiation position, and
       generate a differential spectrophotometric map using a correlation between the first differential spectrophotometric value and the second differential spectrophotometric value.

12. A method for recognizing an object using a multi-wavelength spectrometer, the method comprising:
    extracting a region of interest from an input three-dimensional image and outputting shape information on the region of interest;
    irradiating light of a plurality of wavelengths to an arbitrary position of an object corresponding to the detected region of interest;
    measuring a spectrophotometric value for each light of the plurality of wavelengths;
    generating a differential spectrophotometric map using a differential value between spectrophotometric values of different wavelengths measured at the same light irradiation position; and
    recognizing the object using the differential spectrophotometric map.

13. The method of claim 12, wherein the generating of the differential spectrophotometric map comprises dividing the region of interest into a plurality of partial regions using a correlation between differential spectrophotometric values calculated for different light irradiation positions of the object.

14. The method of claim 12, wherein the generating of the differential spectrophotometric map comprises dividing the region of interest into a plurality of partial regions using a dividing technique including region growing on the basis of a differential spectrophotometric value calculated for an arbitrary light irradiation position.

15. The method of claim 12, wherein the generating of the differential spectrophotometric map comprises generating a cluster of spectrophotometric values based on a light irradiation position within the region of interest, and generating the differential spectrophotometric map using an average value of differential spectrophotometric values calculated for the light irradiation position within the cluster.

16. The method of claim 12, wherein the generating of the differential spectrophotometric map comprises:
   calculating a first differential spectrophotometric value between the light of the first wavelength and the light of the second wavelength for the first light irradiation position;
   calculating a second differential spectrophotometric value between the light of the first wavelength and the light of the second wavelength for the second light irradiation position; and
   dividing the region of interest into a plurality of partial regions using a correlation between the first differential spectrophotometric value and the second differential spectrophotometric value.

17. The method of claim 12, wherein the recognizing of the object comprises dividing the region of interest into a plurality of partial regions, and recognizing the object on the basis of a correlation between spectrometry-based property information detected from the partial regions and the shape information.

18. The method of claim 12, wherein the recognizing of the object comprises dividing the region of interest into a plurality of partial regions, and comparing spectrometry-based property information detected from the partial regions with property information of a pre-established property information database, so as to recognize the object.

19. The method of claim 1, further comprising:
   dividing the region of interest into a plurality of partial regions using the differential spectrophotometric map, and calculating standard errors for differential spectrophotometric values for each partial region so as to determine whether the calculated values exceed a preset threshold value; and
   irradiating, when it is determined that at least one of the standard errors for differential spectrophotometric values calculated for each partial region exceeds the preset threshold value, light of a wavelength different from a plurality of wavelengths of previously irradiated light.

* * * * *